(12) United States Patent
Kumar et al.

(10) Patent No.: US 12,212,485 B2
(45) Date of Patent: *Jan. 28, 2025

(54) MULTICASTING WITHIN A MUTUAL SUBNETWORK

(71) Applicant: Cisco Technology, Inc., San Jose, CA (US)

(72) Inventors: Rajeev Kumar, Sunnyvale, CA (US); Rajagopal Venkatraman, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/317,576

(22) Filed: May 15, 2023

(65) Prior Publication Data

US 2023/0291680 A1   Sep. 14, 2023

Related U.S. Application Data

(63) Continuation of application No. 17/368,503, filed on Jul. 6, 2021, now Pat. No. 11,652,734.

(51) Int. Cl.
| | |
|---|---|
| *H04L 45/16* | (2022.01) |
| *H04L 12/18* | (2006.01) |
| *H04L 43/12* | (2022.01) |
| *H04L 45/00* | (2022.01) |

(52) U.S. Cl.
CPC .......... *H04L 45/16* (2013.01); *H04L 12/1886* (2013.01); *H04L 43/12* (2013.01); *H04L 45/20* (2013.01); *H04L 45/66* (2013.01)

(58) Field of Classification Search
None
See application file for complete search history.

(56) References Cited

U.S. PATENT DOCUMENTS

| | | | | |
|---|---|---|---|---|
| 7,453,873 | B1* | 11/2008 | Takefman | H04L 41/12 370/465 |
| 9,819,505 | B2 | 11/2017 | Bhat et al. | |
| 11,652,734 | B2* | 5/2023 | Kumar | H04L 45/16 370/401 |
| 2002/0191584 | A1 | 12/2002 | Korus et al. | |
| 2003/0088696 | A1 | 5/2003 | McCanne | |
| 2004/0252690 | A1 | 12/2004 | Pung et al. | |
| 2014/0328343 | A1 | 11/2014 | Kapadia et al. | |
| 2015/0055650 | A1 | 2/2015 | Bhat et al. | |
| 2015/0188808 | A1 | 7/2015 | Ghanwani et al. | |

(Continued)

OTHER PUBLICATIONS

Office Action for U.S. Appl. No. 17/368,503, mailed on Aug. 31, 2022, Kumar, "Multicasting Within a Mutual Subnetwork", 8 pages.

(Continued)

*Primary Examiner* — Xavier S Wong
(74) *Attorney, Agent, or Firm* — Lee & Hayes, P.C.

(57) ABSTRACT

A method may include bridging in, via a fabric, a multicast data packet from a source device to a first edge device of a plurality of edge devices and flooding the multicast data packet to the plurality of edge devices within a mutual subnetwork of the fabric. The method further includes bridging out the multicast data packet from a second edge device of the plurality of edge devices to a receiving device. The source device and the receiving device are located within the mutual subnetwork.

20 Claims, 7 Drawing Sheets

(56) References Cited

U.S. PATENT DOCUMENTS

| | | |
|---|---|---|
| 2015/0195178 A1 | 7/2015 | Bhattacharya et al. |
| 2015/0222533 A1* | 8/2015 | Birrittella ............. H04L 5/0055 |
| | | 370/392 |
| 2015/0244617 A1 | 8/2015 | Nakil et al. |
| 2016/0105471 A1 | 4/2016 | Nunes et al. |
| 2017/0279624 A1 | 9/2017 | He et al. |
| 2017/0318453 A1 | 11/2017 | Raghu |
| 2018/0006833 A1* | 1/2018 | Tatlicioglu .............. H04L 49/70 |
| 2018/0124074 A1* | 5/2018 | Natarajan ........... H04L 63/1416 |
| 2018/0227195 A1 | 8/2018 | Dumitriu et al. |
| 2022/0060415 A1* | 2/2022 | Dutta ...................... H04L 45/22 |
| 2023/0010247 A1 | 1/2023 | Kumar |

OTHER PUBLICATIONS

PCT Search Report and Written Opinion mailed Oct. 28, 2022 for PCT application No. PCT/US2022/036087, 11 pages.

\* cited by examiner

MULTICASTING WITHIN A MUTUAL SUBNETWORK

CROSS-REFERENCE TO RELATED APPLICATIONS

This application is a continuation of and claims priority to, U.S. application Ser. No. 17/368,503, filed on Jul. 6, 2021, entitled "Multicasting Within a Mutual Subnetwork," the disclosures of which are expressly incorporated by reference herein.

TECHNICAL FIELD

The present disclosure relates generally to multicasting within a network. Specifically, the present disclosure relates to systems and methods for transmitting data packets in a multicast manner to a number of devices within a mutual subnetwork within a fabric.

BACKGROUND

A fabric is a logical group of computing devices that is managed as a single entity in one or multiple locations. Having a fabric in place enables several capabilities, such as the creation of virtual networks (e.g., virtual local area network (VLAN) and user and device groups, and advanced reporting. Other capabilities include intelligent services for application recognition, traffic analytics, traffic prioritization, and steering for optimum performance and operational effectiveness, among other capabilities. Multicasting in a fabric environment allows for group communication among the computing devices within the fabric.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Figure 1:
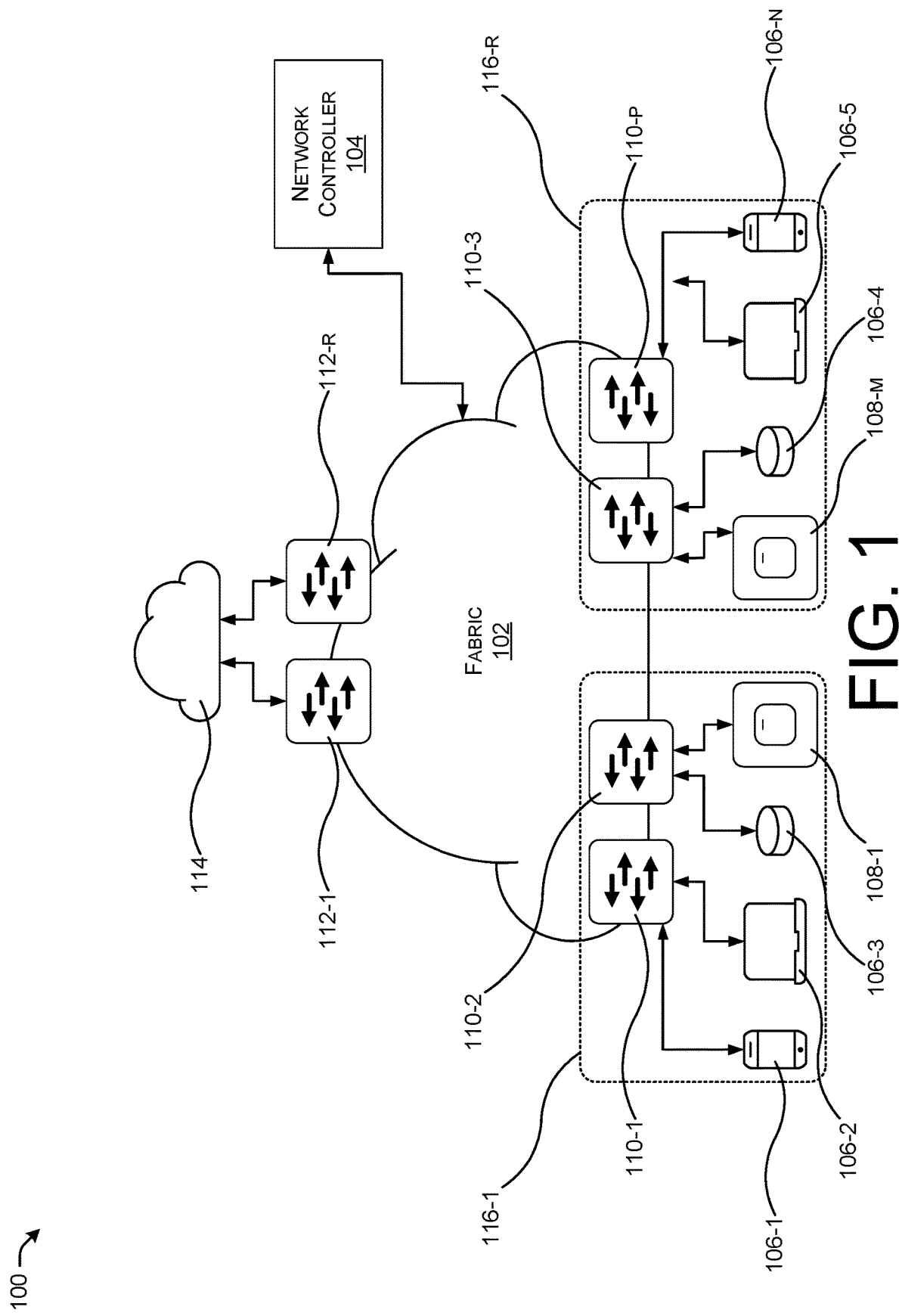
FIG. 1 illustrates a system-architecture diagram of a network that utilizes fabric multicasting within a mutual subnetwork, according to an example of the principles described herein.

Multicast data transmissions in a fabrics may be performed over Layer3 of the Open Systems Interconnection (OIC) model. In one example, the multicasting of data transmissions may occur over an internet-based network such as the software-defined access (SDA) solution within a digital network architecture (DNA) such as the DNA solution developed and distributed by Cisco Systems, Inc. Further, an SDA solution may utilize protocol-independent multicast (PIM) multicast routing protocols for internet protocol (IP) networks that provide one-to-many and many-to-many distribution of data over a local area network (LAN), a wide area network (WAN), the Internet, and other types of networks. Rather than utilizing a topology discovery mechanism, PIM, instead, utilizes routing information supplied by other routing protocols, is not dependent on a specific unicast routing protocol, and may make use of any unicast routing protocol in use on the fabric. Further, PIM does not build routing tables, but utilizes the unicast routing table for reverse path forwarding. Still further, a fabric provided over Layer2 also works over Layer3.

Overview

A Layer 3 (L3) multicast domain may include a source device and any number of fabric edges. A receiver device present in the same subnetwork as the source device may obtain multicast traffic through a core network via L3 multicast routing. In one example, Locator/ID separation protocol (LISP), a map-and-encapsulate protocol used within an L3 multicast domain, may be used to transmit multicast data packets from the source device to the receiver device. RFC 1955 describes the functionality of LISP and is incorporated herein by reference.

A number of applications (hereinafter "APPs") may utilize or benefit from multicasting group communication where data transmission is addressed to a group of destination computers simultaneously in order to quickly and efficiently transmit data packets through the network. Multicasting techniques may be implemented at the data link layer (e.g. Layer 2 (hereinafter L2)) using one-to-many addressing and switching or may be implemented at the Internet layer (e.g. L3) using IP multicast.

In one example, an application (hereinafter APP) may seek to communicate via a form of multicasting in order to interact with a group of computing devices within the multicast group. For example, a number of intelligent virtual assistants (IVAs) may be included within the multicast group. An intelligent virtual assistant may include, for example, Amazon Alexa intelligent virtual assistant developed and distributed by Amazon.com, Inc. An administrator of the number of IVAs may desire to discover and/or register, for example, the IVAs within the multicast group. However, in most scenarios, the APP may only be interested in scanning a local area network (LAN) and may not be interested in any IVAs outside the LAN. Stated another way, the APP may not wish multicast discovery packets to go across subnetwork boundaries. In practice, this may include the APP seeking to discover a number of Amazon Alexa intelligent virtual assistant within a first individual's residence without also discovering and registering a next door neighbor's Amazon Alexa intelligent virtual assistant. Thus, in order to avoid discovery of devices outside the subnetwork (e.g., the LAN), the APP and associated hardware may set a time-to-live (TTL) value to 1 (e.g., TTL=1) for such multicast discovery packets.

However, because routing may be utilized within the same subnetwork and because the IVAs may be included within a fabric, the multicast discovery packets will be lost due to expiry of the TTL. This results in the multicast discovery packets never reaching the receiving device (e.g., the IVAs) even within the same subnetwork. This may lead to customer dissatisfaction with the performance of the APPs and underlying hardware within the fabric.

In the examples described herein, systems and methods are provided for transmitting data packets in a multicast manner to a number of devices within a mutual subnetwork within a fabric. Further, the present systems and methods allow for any data packet having TTL=1 to be bridged in a virtual network and a copy of that data packet sent over the fabric to all fabric edge devices which in turn perform L2 multicast forwarding. Further, the present systems and methods allow for any data packet having TTL!=1 (e.g., TTL>1) to be routed over the fabric to all fabric edge devices which in turn perform L3 routing to a receiving device. In this manner, the present systems and methods are able to support a myriad of different APPs that may function over L2 and/or L3.

Examples described herein provide a method including bridging in, via a fabric, a multicast data packet from a source device to a first edge device of a plurality of edge devices, and flooding the multicast data packet to the plurality of edge devices within a mutual subnetwork of the fabric. The method further includes bridging out the multicast data packet from a second edge device of the plurality of edge devices to a receiving device. The source device and the receiving device are located within the mutual subnetwork.

The method further includes determining a time to live (TTL) value of the multicast data packet. The bridging in, the flooding, and the bridging out to transmit the multicast data packet from the source device to the receiving device is based at least in part on the multicast data packet having a TTL value of 1. The method further includes determining a time to live (TTL) value of the multicast data packet, and, based at least in part on the multicast data packet having a TTL value greater than 1, routing the multicast data packet via multicast routing.

The method further includes identifying a plurality of edge devices within the fabric via snooping to create a list of the plurality of edge devices, and transmitting the list of the plurality of edge devices to each of the plurality of edge devices within the mutual subnetwork.

The bridging out of the multicast data packet from the second edge device is based at least in part on the list of the plurality of edge devices. Further, the snooping includes Internet Group Management Protocol (IGMP) snooping including listening to network traffic within the fabric to control delivery of the multicast data packet. The second edge device bridges out the multicast data packet to the receiving device via layer 2 multicast forwarding.

Examples described herein also provide a non-transitory computer-readable medium storing instructions that, when executed, causes a processor to perform operations, including bridging in, via a fabric, a multicast data packet from a source device to a first edge device of a plurality of edge devices, and flooding the multicast data packet to the plurality of edge devices within a mutual subnetwork of the fabric. The operations further include bridging out the multicast data packet from a second edge device of the plurality of edge devices to a receiving device. The source device and the receiving device are located within the mutual subnetwork.

The operations further include determining a time to live (TTL) value of the multicast data packet. The bridging in, the flooding, and the bridging out to transmit the multicast data packet from the source device to the receiving device is based at least in part on the multicast data packet having a TTL value of 1. The operations further include determining a time to live (TTL) value of the multicast data packet, and, based at least in part on the multicast data packet having a TTL value greater than 1, routing the multicast data packet via multicast routing.

The operations further include identifying a plurality of edge devices within the fabric via snooping to create a list of the plurality of edge devices, and transmitting the list of the plurality of edge devices to each of the plurality of edge devices within the mutual subnetwork.

The bridging out of the multicast data packet from the second edge device is based at least in part on the list of the plurality of edge devices. The snooping includes Internet Group Management Protocol (IGMP) snooping including listening to network traffic within the fabric to control delivery of the multicast data packet. The second edge device bridges out the multicast data packet to the receiving device via layer 2 multicast forwarding.

Examples described herein also provide a computing device including a processor and a non-transitory computer-readable media storing instructions that, when executed by the processor, causes the processor to perform operations. The operations include determining a time to live (TTL) value of a multicast data packet, and based at least in part on the multicast data packet having a TTL value of 1, bridging in, via a fabric, the multicast data packet from a source device to a first edge device of a plurality of edge devices, flooding the multicast data packet to the plurality of edge devices within a mutual subnetwork of the fabric, and bridging out the multicast data packet from a second edge device of the plurality of edge devices to a receiving device. The source device and the receiving device are located within the mutual subnetwork.

The operations further include, based at least in part on the multicast data packet having a TTL value greater than 1, routing the multicast data packet via multicast routing. The operations further include identifying a plurality of edge devices within the fabric via snooping to create a list of the plurality of edge devices, and transmitting the list of the plurality of edge devices to each of the plurality of edge devices within the mutual subnetwork.

The bridging out of the multicast data packet from the second edge device is based at least in part on the list of the plurality of edge devices. The snooping includes Internet Group Management Protocol (IGMP) snooping including listening to network traffic within the fabric to control delivery of the multicast data packet. The second edge device bridges out the multicast data packet to the receiving device via layer 2 multicast forwarding.

Additionally, the techniques described in this disclosure may be performed as a method and/or by a system having non-transitory computer-readable media storing computer-executable instructions that, when executed by one or more processors, performs the techniques described above.

EXAMPLE EMBODIMENTS

Turning now to the figures, FIG. 1 illustrates a system-architecture diagram of a network 100 that utilizes fabric multicasting within a mutual subnetwork, according to an example of the principles described herein. The example of FIG. 1 is included within a fabric architecture and may include at least one aspect of an enterprise networking access solution. In one example, the enterprise networking access solution may include the Software-Defined Access (SDA) enterprise networking access solution developed and distributed by Cisco Systems, Inc. An SDA enterprise networking access solution includes a programmable network architecture that provides software-based policy and segmentation from the edge of the network to the applications. The SD-Access may be implemented via an intent-based network solution such as, for example the Digital Network Architecture intent-based network solution developed and distributed by Cisco Systems, Inc. The Cisco DNA Center provides design settings, policy definition, and automated provisioning of the network elements, as well as assurance analytics for an intelligent wired and/or wireless network.

Still further, the fabric architecture of FIG. 1 may include at least one aspect of a secure campus fabric that provides infrastructure for building virtual networks based on policy-based segmentation constructs. Although examples described herein utilize However, the network environment and architecture of FIG. 1 may include any type of network architecture and any number of network features that may be associated with a fabric architecture.

The network 100 including the fabric architecture of FIG. 1 may transmit data packets over both the data link layer (L2) and the network layer (L3) based on a TTL value associated with the data packets. As will be described in more detail below, a TTL (sometimes referred to as a hop limit) may include any mechanism which limits the lifespan or lifetime of data in a computer or network. TTL may be implemented as a counter or timestamp attached to or embedded in the data packet. Once the prescribed event count or timespan has elapsed, the data is either dropped (e.g., discarded) or revalidated. In the present systems and methods, the TTL prevents a data packet from being circulated between networked devices indefinitely. Thus, for example, a TTL value of 1 will cause the data packet to be transmitted to a first networked device at which the TTL will decrement to 0 and will not be able to be transmitted to a second networked device. However, a TTL value associated with a data packet will not decrement when transmitted via the fabric multicast systems and methods described herein. More details regarding the fabric multicast systems and methods is described herein.

The network 100 may include a fabric 102. As used herein, the phrase "fabric" refers to a one or more network elements, forming a network, including switches, routers, servers, storage devices, or one or more components of a network device such as one or more network ports of a switch or router, etc. The fabric 102 may include, for example, a campus fabric that provides infrastructure for building virtual networks. The virtual networks may be built based on policy-based segmentation constructs. A number of fabric edge devices 110-1, 110-2, 110-3, 110-P, where P is any integer greater than or equal to 1 (collectively referred to as "edge device(s) 110"), may be included as part of the fabric 102. The fabric edge devices 110 may include any computing device which provides an entry point into enterprise or service provider core networks. For example, the fabric edge devices 110 may include routers, routing switches, integrated access devices (IADs), multiplexers, and a variety of metropolitan area network (MAN) and wide area network (WAN) access devices. The fabric edge devices 110 may also provide connections into carrier and service provider networks. In one example, the fabric edge devices (referred to as leaf node in border gateway protocol (BGP) terms) may include a network access device such as a Catalyst 9000 switch device developed and distributed by Cisco Systems, Inc. The fabric edge devices 110 may include access-layer switches where all of the endpoints reside. In one example, the fabric edge devices detect clients and register them with the control plane nodes included within the network 100.

The network 100 may further include a number of fabric border nodes 112-1, 112-R, where R is any integer greater than or equal to 1 (collectively referred to as "fabric border node(s) 112"). The fabric border nodes 112 may include any fabric device such as a core or distribution switch that connects external L3 network(s) to the SDA fabric. The fabric border nodes 112 serve as gateways between, for example the SDA fabric and external networks such as the IP network 114.

The IP network 114 may provide access for a digital network architecture (DNA) such as the DNA solution developed and distributed by Cisco Systems, Inc. to automate and manage the SDA fabric. In one example, a DNA Center may be responsible for design, provisioning, policy application, and overall creation of the SDA fabric, and may also enable proactive monitoring and insights into the network 100 via network assurance.

A network controller 104 may be included within the network 100 to allow an administrator, for example, to control the manner in which the various devices within the network 100 transmit data packets, and perform the functions of the various devices as described herein.

The network 100 may further include a number of fabric access point (AP) devices 108-1, 108-M, where M is any integer greater than or equal to 1 (collectively referred to as "fabric AP device(s) 108"). The fabric AP devices 108 may include any fabric enabled device directly connected to a fabric edge device 110 and part of the fabric overlay. The AP devices 108 further assists other devices to connect to the fabric 102 and/or the fabric edge devices 110.

For example, a number of client devices 106-1, 106-2, 106-3, 106-4, 106-5, 106-N, where N is any integer greater than or equal to 1 (collectively referred to as "client device(s) 106") may connect to the fabric 102 and/or the fabric edge devices 110. The client devices 106 may include, for example, intelligent virtual assistants such as the Amazon Alexa intelligent virtual assistant developed and distributed by Amazon.com, Inc. The client devices 106 may also include, for example, personal computers (e.g., desktop computers, laptop computers, etc.), mobile devices (e.g., smartphones, tablets, personal digital assistants (PDAs), electronic reader devices, etc.), wearable computers (e.g., smart watches, optical head-mounted displays (OHMDs), etc.), and other computing devices that may serve as endpoint devices. Each of the client devices 106 may be coupled to a fabric edge device 110 via a wired or wireless connection.

In one example, the client devices 106 and/or the fabric AP devices 108 may form a number of subnetworks 116-1, 116-R, where R is any integer greater than or equal to 1 (collectively referred to as "subnetwork(s) 116"). The subnetworks 116 may define, for example, logical subdivisions of the network 100 including the fabric 102. The subnetworks may include a number of the client devices 106, the fabric AP devices 108, and/or the fabric edge devices 110 such that one or more subnetworks 116 may be created among these devices. The subnetworks 116 may include a number of virtual networks. The virtual network may include, for example, a virtual local area network (VLAN), a virtual private network (VPN), a virtual extensible local area network (VXLAN), among other virtual networks.

In the examples described herein, the data packets may be switched from the client devices 106 and/or the fabric AP devices 108 to the fabric edge devices 110 using a virtual network and tunnel encapsulation. In one example, the network 100 may treat the client devices 106 at the edge of the fabric 102 as tunnel endpoints. As a data packet enters the tunnel endpoint, the data packet may be encapsulated in accordance to the techniques described herein before it enters the fabric 102. Here, the data packets may include a multicast data packet that is sent to a plurality of the client devices 106. More regarding the transmission of the multicast data packet is described in more detail below.

The network 100 and subnetworks 116 depicted in FIG. 1 may be wired networks, wireless networks, or a combination thereof. Further, the network 100 and subnetworks 116 may utilize any protocols and communication standards supported by any wired networks and/or wireless networks.

As mentioned above, a number of Apps may use multicasting techniques to, for example, discover and/or register a number of computing devices within the network 100 and, more specifically, within individual subnetworks 116. This may be the case since discovery and/or registry of computing devices may not extend to outside a given subnetwork 116. In the example of the Amazon Alexa intelligent virtual assistant, a user of a smart phone such as, for example, client device 106-1 may utilize an APP executed thereon to discover an Amazon Alexa intelligent virtual assistant such as client device 106-3 within the same subnetwork 116-1. This may be the case since a second Amazon Alexa intelligent virtual assistant such as client device 106-4 within a different subnetwork 116-R may be owned or otherwise proprietary to the different subnetwork 116-R and discovery and/or registry of client device 106-4 within subnetwork 116-1 may preclude a user within the different subnetwork 116-R from discovering and/or registering the client device 106-4 within a different subnetwork 116-R.

In order to ensure that the discoveries and/or registries of computing devices across the boundaries of the different subnetworks 116 does not occur, a TTL of a multicast data packet may be set to 1. However, in a multicast instance where routing is used in the same subnetwork 116, the multicast data packets are dropped or lost due to expiry of the TTL. This results in the multicast discovery packets never reaching the receiving device (e.g., the IVAs) even within the same subnetwork. This may lead to customer dissatisfaction with the performance of the APPs and underlying hardware within the fabric.

However, in an example utilizing the fabric 102 of FIG. 1, a multicast data packet may be disseminated to a number of receiving devices (e.g., the client devices 106 within the same subnetwork 116) by using bridging in of the client devices 106 with the fabric edge devices 110, flooding the multicast data packet to the plurality of fabric edge devices 110 within a mutual subnetwork 116, and bridging out the multicast data packet from the fabric edge devices 110 to the client devices 106. In this manner, the multicast data packet is tunneled through the fabric 102 without decrementing the TTL value (e.g., TTL=1) that may otherwise result in the dropping of the multicast data packet.

In order to establish multicast group memberships among the client devices 106, the Internet Group Management Protocol (IGMP) may by used by the client devices 106, the fabric AP devices 108, the fabric edge devices 110, and/or the network controller 104. IGMP assists these devices within the Internet protocol version 4 (IPv4) network in allowing the network 100 to direct multicast transmissions to those devices (e.g., the client devices 106) that have requested the multicast transmissions or otherwise requested to be included within the multicast group.

In one example, IGMP snooping may be used by these devices, and, in particular, the fabric edge devices 110, to listen to IGMP network traffic to control delivery of the IP multicast data packets to the client devices 106. Network switches including the fabric edge devices 110 utilize IGMP snooping to listen in on IGMP conversation between the client devices 106 and the fabric AP devices 108, the fabric edge devices 110, and other devices within the fabric 102 and maintains a multicast data list or other database of which links between these devices are to be included within a number of IP multicast transmissions. This multicast data list created via the IGMP snooping may be stored within any device in the network 100 including the client devices 106, the fabric AP devices 108, the fabric edge devices 110, the network controller 104, and other devices within the network 100. In this manner, the fabric edge devices 110 may flood multicast traffic and data packets to all the ports within the multicast domain of a virtual network. IGMP snooping prevents the client devices 106 within a subnetwork 116 from receiving data packets for a multicast group they have not explicitly joined or from a subnetwork 116 of which they do not belong. Further IGMP snooping is a layer 2 optimization for the layer 3 IGMP. IGMP snooping takes place internally on the fabric edge devices 110 and other switches. IGMP snooping allows the fabric edge devices 110 and other switches to only forward multicast traffic to the links that have solicited them.

Figure 2:
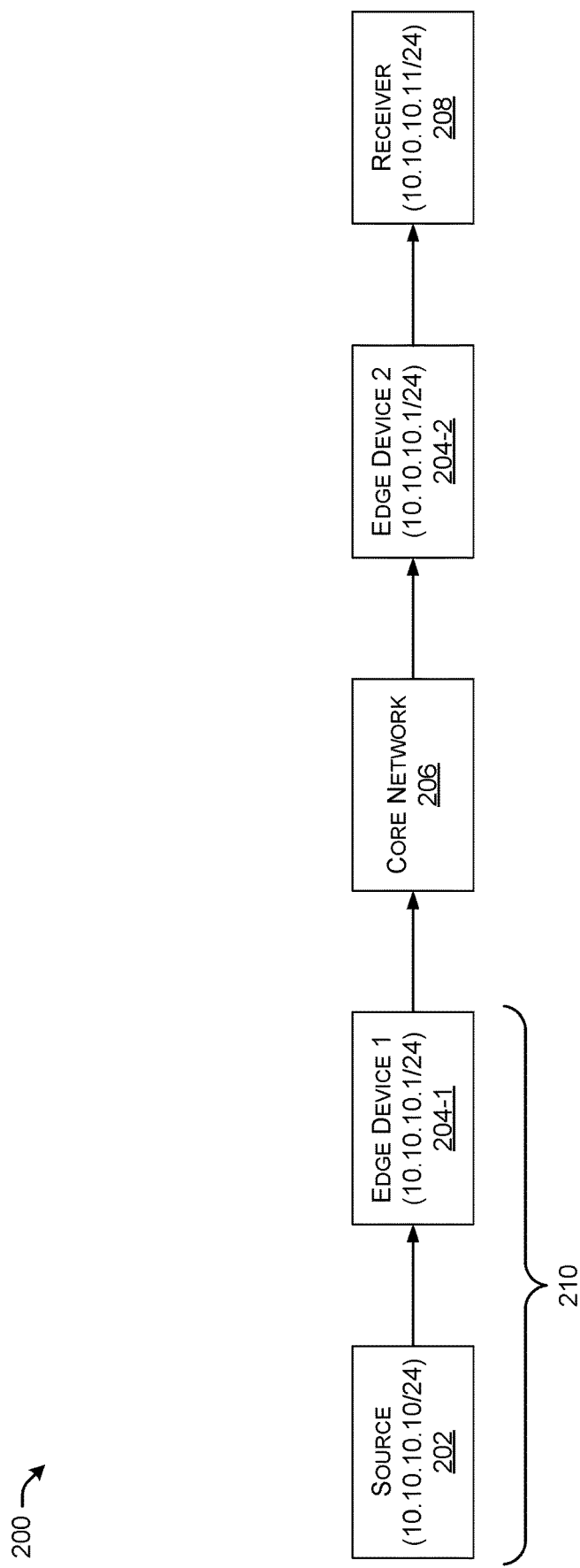
FIG. 2 illustrates a data diagram of transmission of a data packet via Layer 3 (L3) multicast routing, according to an example of the principles described herein.
Figure 3:
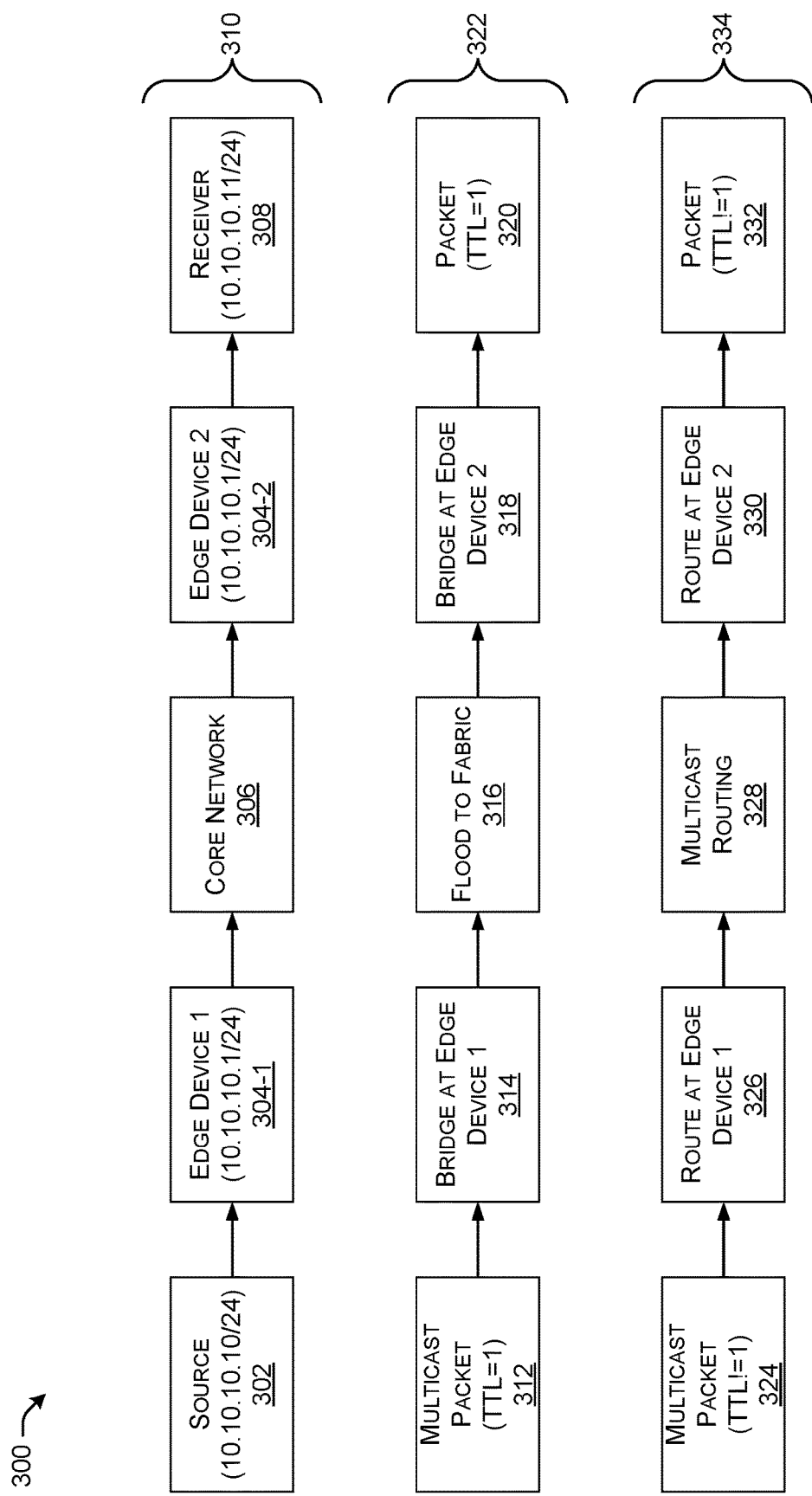
FIG. 3 illustrates a data diagram of transmission of a data packet via Layer 2 (L2) multicast forwarding via a fabric and within a mutual subnetwork, according to an example of the principles described herein.

An understanding of the manner in which the present systems and methods for multicasting within a mutual subnetwork are achieved may be obtained by considering that data diagrams of FIGS. 2 and 3. Beginning with FIG. 2, FIG. 2 illustrates a data diagram 200 of transmission of a data packet via L3 multicast routing, according to an example of the principles described herein. The example of FIG. 2 depicts a manner in which a receiver 208 present in the same subnetwork 116 as a source 202 obtains the multicast data packet and any multicast traffic through a core network 206 via L3 multicast routing. It is noted that the IP addresses of the various devices in FIG. 2 indicate that they are all within the same subnetwork 116. For example, a source 202 (such as, for example, client device 106-1 of FIG. 1) may have an IP address of "10.10.10.10/24" and a receiver 208 (such as, for example, client device 106-3 of FIG. 1)) may have an IP address of "10.10.10.11/24" indicating that the source 202 and the receiver 208 are located within a mutual or the same subnetwork 116. Further, a first edge device 204-1 referred to as edge device 1 in FIG. 2 (such as, for example, fabric edge device 110-1 of FIG. 1) may have an IP address of "10.10.10.1/24" and a second edge device 204-2 referred to as edge device 2 in FIG. 2 (such as, for example, fabric edge device 110-2 of FIG. 1) may have an IP address of "10.10.10.1/24" indicating that the first edge device 204-1 and the second edge device 204-2 are located within a mutual or the same subnetwork 116. Further, based on the IP addresses indicated in FIG. 2, the source 202, the receiver 208, the first edge device 204-1, and the second edge device 204-2 indicate that these devices are located in a mutual subnetwork 116-1.

The core network 206 depicted in FIG. 2 may include any portion of the network 100 of FIG. 1 that interconnects networks and provides a path for the exchange of data packets between different LANs or subnetworks including the subnetworks 116-1, 116-2. The core network 206 may be used to communicatively couple diverse networks within the same building, in different buildings in a campus environment, or over wide areas, for example. For example, a corporation or similar entity that has many locations may have a core network 206 that communicatively coupled all of the locations together, for example, if a server cluster needs to be accessed by different departments of the entity that are located at different geographical locations.

Turning again to FIG. 2 and in one example, a receiver 208 may obtain the multicast data packet from the source 202 through a core network 206 via Locator/ID Separation Protocol (LISP), a map-and-encapsulate protocol used within an L3 multicast domain 210. As mentioned above, many APPs may use multicast groups for discoveries but may only want to scan the same subnetwork 116 (e.g., the same local area network or virtual network) without the scan also discovering computing devices across the boundary of the subnetwork 116. For this reason, the TTL value of the multicast data packets transmitted within the example data diagram 200 of FIG. 2 may be set at TTL=1 to ensure that the multicast data packets do not extend past the subnetwork 116. However, because routing is used even within the same subnetwork, the multicast data packets are lost due to expiry of the TTL. This results in the multicast data packets failing to reach the receiver 208.

Thus, in order to allow for the multicasting of data packets within the same subnetwork 116 of a fabric 102, the systems and methods described in connection with FIG. 3 may be utilized. FIG. 3 illustrates a data diagram 300 of transmission of a data packet via Layer 2 (L2) multicast forwarding via a fabric 102 and within a mutual subnetwork 116, according to an example of the principles described herein. Because the fabric 102 for L2 also works over L3, the network architecture described above in connection with FIG. 1 may be used to provide multicasting of data packets without the potential for the multicast data packets being lost or dropped.

As depicted in FIG. 3, the source 302, edge device 1 304-1, core network 306, edge device 2 304-2, and receiver 308 have the same IP addresses and network association as described above in connection with the same elements of FIG. 2. The network association 310 of FIG. 3, however, utilizes IGMP snooping to create a multicast data list or other database to identify which links between these devices are to be included within a number of IP multicast transmissions and use that multicast data list to assist the edge device 1 304-1 and the edge device 2 304-2 (e.g., the fabric edge devices 110 of FIG. 1) to flood multicast traffic and data packets to all the ports within the multicast domain of a virtual network.

In instances where the multicast data packets have a TTL value equal to 1 as indicated by 322, the present systems and methods may cause bridging in, via the fabric 102, a multicast data packet from a source device such as client device 106-1 to a first edge device such as fabric edge device 110-1 of the plurality of fabric edge devices 100 as indicated at 312 and 314. A copy of the multicast data packet is flooded at 316 to the plurality of fabric edge devices 110 within a mutual subnetwork 116 of the fabric 102. Once each fabric edge device 110 receives a copy of the multicast data packet, the multicast data packet is bridged out from all the fabric edge devices 110 to at least one receiving device such as such as client devices 106-2 and 106-3 as indicated at 318 and 320. This bridging out of the multicast data packet at 318 and 320 may be based on the multicast data list created based on the IGMP snooping and stored within all these devices. In one example, the bridging out of the multicast data packet may occur from a second fabric edge device such as fabric edge device 110-2 of the plurality of fabric edge devices 110 to a receiving device such as the client device 106-3. In is noted here that the source device (e.g., client device 106-1) and the receiving device (e.g., client device 106-3) are located within the mutual subnetwork 116-1 based on their IP addresses identified in FIG. 3.

In contrast to the process indicated at 322 where the TTL value of the multicast data packet is 1, in instances where the multicast data packet has a TTL value not equal to 1 (e.g., TTL!=1) as indicated by 334, the present systems and methods may utilize multicast routing. Thus, in stances where TTL>1, the multicast data packet at 324 may be routed to a first edge device (e.g., edge device 1 304-1) such as fabric edge device 110-1 of FIG. 1. The multicast data packet may be subjected to multicast routing at 328 via the fabric 102. The multicast data packet may be received at a second edge device (e.g., edge device 2 304-2) such as fabric edge device 110-3 of FIG. 1 and transmitted from the second edge device to the receiver 308 such as client device 106-3. In this manner, the present systems and methods may accommodate for instances where TTL=1 and where TTL!=1 (e.g., TTL>1) as indicated at 322 and 334 respectively.

Although the above examples are described in connection with the devices within subnetwork 116-1, a similar process described herein may be performed within the subnetwork 116-2. However, it may be noted that the present systems and methods operate to provide multicasting within a mutual subnetwork 116 and not beyond the boundaries of the subnetwork 116.

Figure 4:
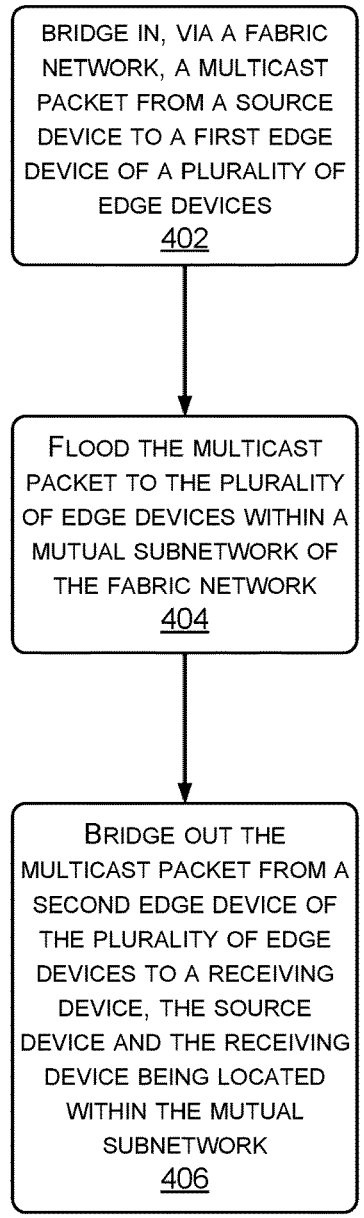
FIG. 4 illustrates a flow diagram of an example method of transmitting a multicast data packet over a fabric, according to an example of the principles described herein.

FIG. 4 illustrates a flow diagram of an example method 400 of transmitting a multicast data packet over a fabric 102, according to an example of the principles described herein. The method 400 of FIG. 4 may include at 402 bridging in, via a fabric 102, a multicast data packet from a source device to a first edge device of a plurality of edge devices. The multicast data packet in this example has a TTL value equal to 1. In one example, the source may include the client device 106-1 and the first edge device may include the fabric edge device 110-1.

At 404, the multicast data packet may be flooded to the plurality of edge devices within a mutual subnetwork 116 of the fabric 102. Here, again, the plurality of edge devices may be any number of the fabric edge devices 110 within an individual subnetwork 116.

The method 400 may further include, at 406, bridging out the multicast data packet from a second edge device of the plurality of edge devices to a receiving device. Here, the second edge device may include the fabric edge device 110-2 and the receiving device may include the client device 106-3. The source device and the receiving device are located within the mutual subnetwork 116.

Figure 5:
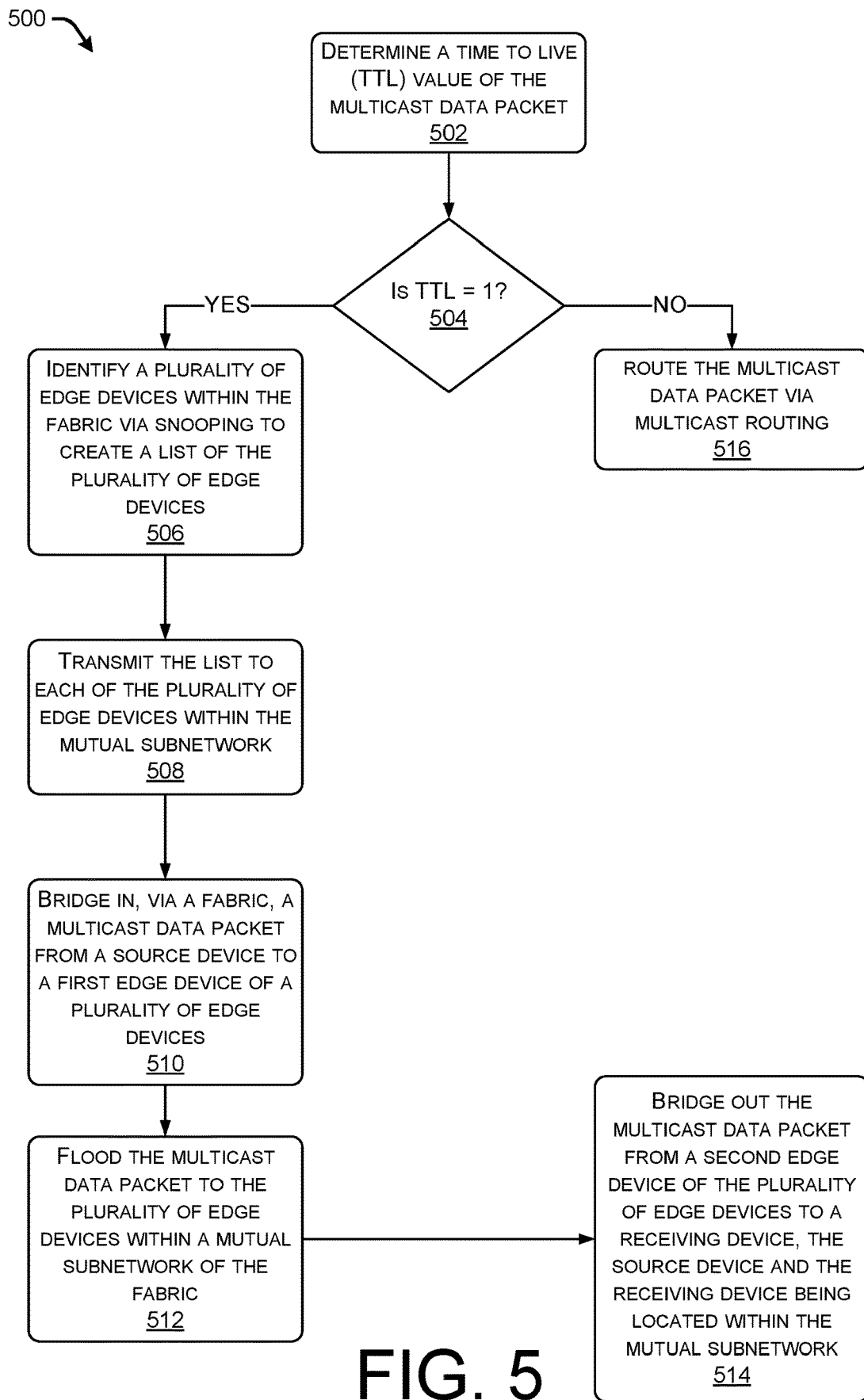
FIG. 5 illustrates a flow diagram of an example method of transmitting a multicast data packet over a fabric, according to an example of the principles described herein.

FIG. 5 illustrates a flow diagram of an example method 500 of transmitting a multicast data packet over a fabric 102, according to an example of the principles described herein. The method of FIG. 5 may begin by determining a time to live (TTL) value of a multicast data packet at 502. At 504, the determination may be made as to whether the TTL=1. In response to a determination that the TTL value of the multicast data packet is not equal to 1 (504, determination NO), the method 500 may include routing the multicast data packet via multicast routing. In one example, the multicast routing may follow the process associated with 334 of FIG. 3 where, in instances where the multicast data packet has a TTL value not equal to 1 (e.g., TTL!=1 or TTL>1), the multicast data packet at 324 may be routed to a first edge device such as fabric edge device 110-1 of FIG. 1. The multicast data packet may be subjected to multicast routing via the fabric 102 and received at a second edge device such as fabric edge device 110-3 of FIG. 1. The multicast data packet may then be transmitted from the second edge device to the receiver 308 such as client device 106-3. It may be noted that the TTL value in this instance may be greater than 1 such as, 4 in order to transmit the multicast data packet from the source 302, FIG. 3 to the receiver 308, FIG. 3 without the TTL value expiring.

In contrast, in response to a determination that the TTL value of the multicast data packet is equal to 1 (504, determination YES), the method 500 may include identifying a plurality of fabric edge devices 110 within the fabric 102 via a snooping process such as, for example, IGMP snooping. The outcome of this processes creates the above-mentioned multicast data list or other database defining links between the client devices 106, the fabric AP devices 108, the fabric edge devices 110, the network controller 104, and other devices within the network 100. This multicast data list created via the IGMP snooping may be stored within any device in the network 100.

The multicast data list may be transmitted at 508 to each of the plurality of fabric edge devices 110 within the mutual subnetwork 116. With this list included within a data storage device of each of the fabric edge devices 110, the method 500 may proceed to 510 where a multicast data packet is bridged in via the fabric 102 from the source 302, FIG. 3 to a first one of the fabric edge devices 110 such as fabric edge device 110-1. At 510, the fabric edge device 110-1 floods the multicast data packet to the remaining plurality of fabric edge devices 110 within a mutual subnetwork 116 of the fabric edge device 110.

At 514, the multicast data packet may be bridged out from a second one of the fabric edge devices 110 such as fabric edge device 110-3 to a receiver 308, FIG. 3. In this manner, the multicast data packet having a TTL=1 may be successfully transmitted from a source device, through the fabric 102 and to a receiving device without decrementing the TTL value.

Figure 6:
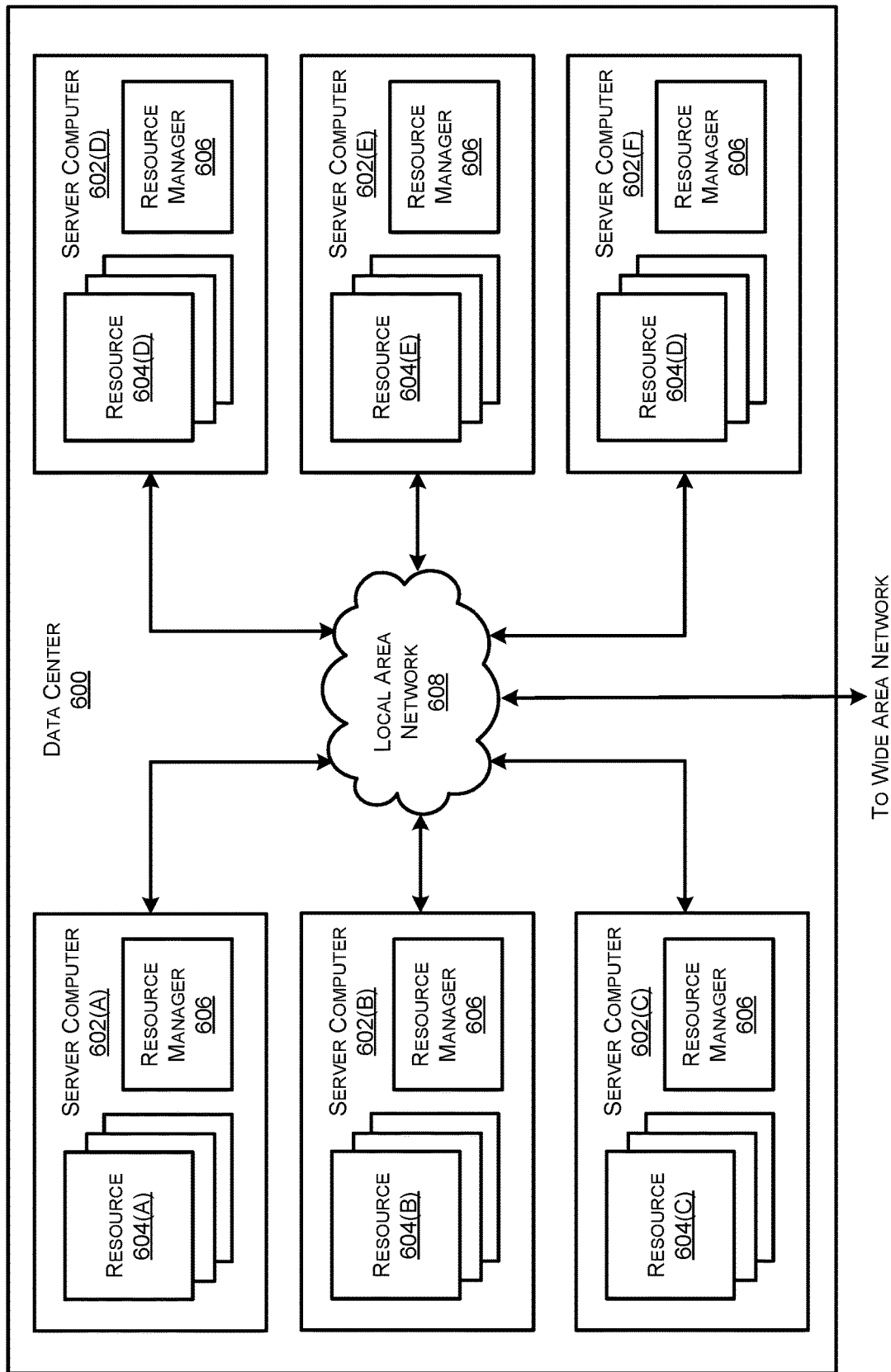
FIG. 6 illustrates a computing system diagram illustrating a configuration for a data center that may be utilized to implement aspects of the technologies disclosed herein.

FIG. 6 illustrates a computing system diagram illustrating a configuration for a data center 600 that may be utilized to implement aspects of the technologies disclosed herein. The example data center 600 shown in FIG. 6 includes several server computers 602A-602F (which might be referred to herein singularly as "a server computer 602" or in the plural as "the server computers 602) for providing computing resources. In some examples, the resources and/or server computers 602 may include, or correspond to, any type of networked device described herein. Although described as servers, the server computers 602 may include any type of networked device, such as servers, switches, routers, hubs, bridges, gateways, modems, repeaters, access points, etc.

The server computers 602 may be standard tower, rack-mount, or blade server computers configured appropriately for providing computing resources. In some examples, the server computers 602 may provide computing resources 604 including data processing resources such as VM instances or hardware computing systems, database clusters, computing clusters, storage clusters, data storage resources, database resources, networking resources, virtual private networks (VPNs), and others. Some of the server computers 602 may also be configured to execute a resource manager 606 capable of instantiating and/or managing the computing resources. In the case of VM instances, for example, the resource manager 606 may be a hypervisor or another type of program configured to enable the execution of multiple VM instances on a single server computer 602. Server computers 602 in the data center 600 may also be configured to provide network services and other types of services.

In the example data center 600 shown in FIG. 6, an appropriate LAN 608 is also utilized to interconnect the server computers 602A-602F. It may be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between data centers 600, between each of the server computers 602A-602F in each data center 600, and, potentially, between computing resources in each of the server computers 602. It may be appreciated that the configuration of the data center 600 described with reference to FIG. 6 is merely illustrative and that other implementations may be utilized.

In some examples, the server computers 602 and or the computing resources 604 may each execute/host one or more tenant containers and/or virtual machines to perform techniques described herein.

In some instances, the data center 600 may provide computing resources, like tenant containers, VM instances, VPN instances, and storage, on a permanent or an as-needed basis. Among other types of functionality, the computing resources provided by a cloud computing network may be utilized to implement the various services and techniques described herein. The computing resources 604 provided by the cloud computing network may include various types of computing resources, such as data processing resources like tenant containers and VM instances, data storage resources, networking resources, data communication resources, network services, VPN instances, and the like.

Each type of computing resource 604 provided by the cloud computing network may be general-purpose or may be available in a number of specific configurations. For example, data processing resources may be available as physical computers or VM instances in a number of different configurations. The VM instances may be configured to execute applications, including web servers, application servers, media servers, database servers, some or all of the network services described above, and/or other types of programs. Data storage resources may include file storage devices, block storage devices, and the like. The cloud computing network may also be configured to provide other types of computing resources 604 not mentioned specifically herein.

The computing resources 604 provided by a cloud computing network may be enabled in one example by one or more data centers 600 (which might be referred to herein singularly as "a data center 600" or in the plural as "the data centers 600). The data centers 600 are facilities utilized to house and operate computer systems and associated components. The data centers 600 typically include redundant and backup power, communications, cooling, and security systems. The data centers 600 may also be located in geographically disparate locations. One illustrative example for a data center 600 that may be utilized to implement the technologies disclosed herein is described herein with regard to, for example, FIGS. 1 through 5.

Figure 7:
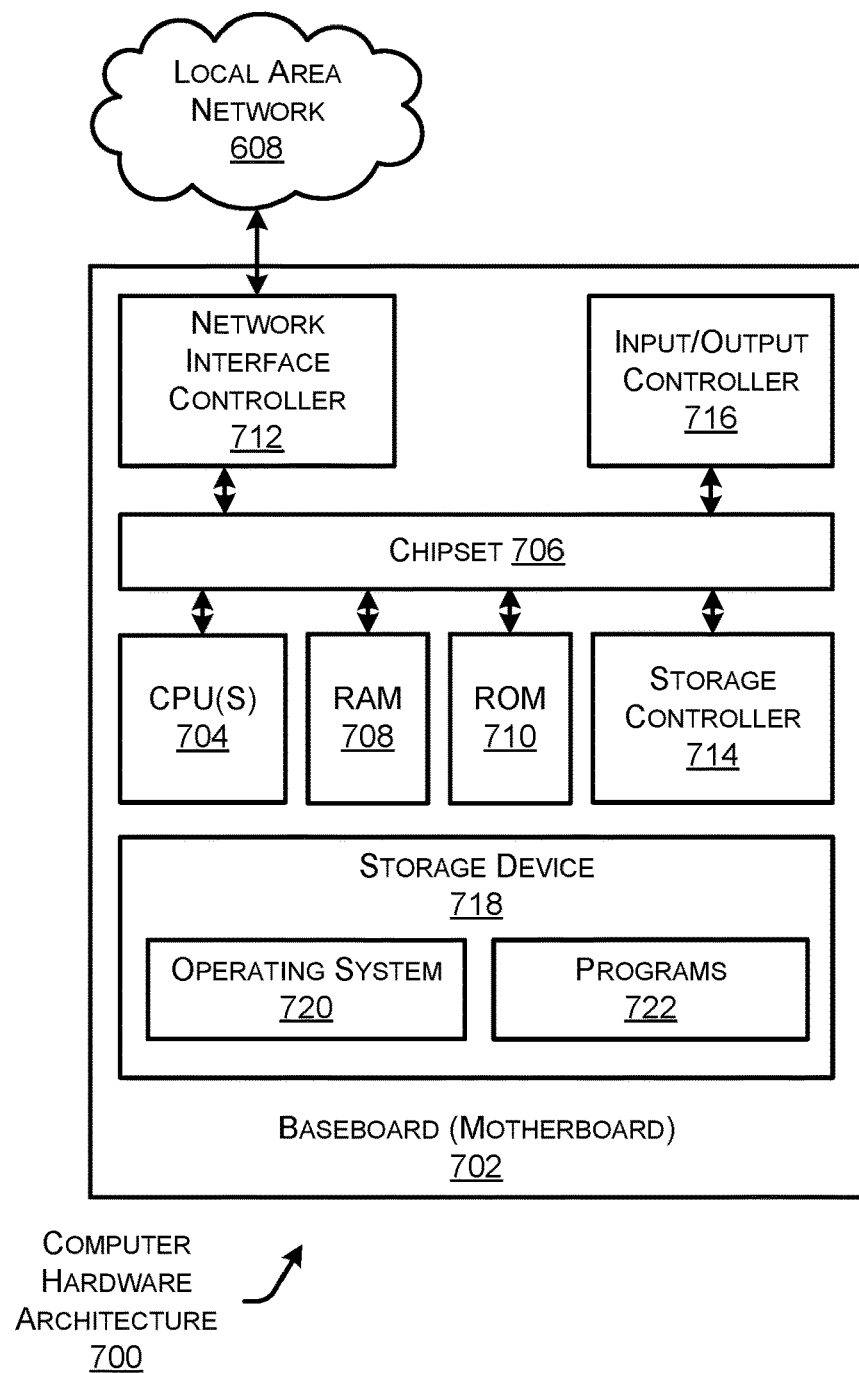
FIG. 7 illustrates a computer architecture diagram showing an example computer hardware architecture for implementing a computing device that may be utilized to implement aspects of the various technologies presented herein.

FIG. 7 illustrates a computer architecture diagram showing an example computer hardware architecture 700 for implementing a computing device that may be utilized to implement aspects of the various technologies presented herein. The computer hardware architecture 700 shown in FIG. 7 illustrates the client devices 106, the fabric AP devices 108, the fabric edge devices 110, the network controller 104, and/or other systems or devices associated with the client devices 106, the fabric AP devices 108, the fabric edge devices 110, and/or the network controller 104 and/or remote from the client devices 106, the fabric AP devices 108, the fabric edge devices 110, and/or the network controller 104, a workstation, a desktop computer, a laptop, a tablet, a network appliance, an e-reader, a smartphone, or other computing device, and may be utilized to execute any of the software components and methods described herein. The computer 700 may, in some examples, correspond to a network device (e.g., the client devices 106, the fabric AP devices 108, the fabric edge devices 110, the network controller 104 and/or associated devices described herein) and may include networked devices such as servers, switches, routers, hubs, bridges, gateways, modems, repeaters, access points, etc.

The computer 700 includes a baseboard 702, or "motherboard," which is a printed circuit board to which a multitude of components or devices may be connected by way of a system bus or other electrical communication paths. In one illustrative configuration, one or more central processing units (CPUs) 704 operate in conjunction with a chipset 706. The CPUs 704 may be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 may provide an interface to a RAM 708, used as the main memory in the computer 700. The chipset 706 may further provide an interface to a computer-readable storage medium such as a read-only memory (ROM) 710 or non-volatile RAM (NVRAM) for storing basic routines that help to startup the computer 700 and to transfer information between the various components and devices. The ROM 710 or NVRAM may also store other software components necessary for the operation of the computer 700 in accordance with the configurations described herein.

The computer 700 may operate in a networked environment using logical connections to remote computing devices and computer systems through a network, such as the client devices 106, the fabric AP devices 108, the fabric edge devices 110, and/or the network controller 104, among other devices. The chipset 706 may include functionality for providing network connectivity through a Network Interface Controller (NIC) 712, such as a gigabit Ethernet adapter. The NIC 712 is capable of connecting the computer 700 to other computing devices within the network 100 and external to the network 100. It may be appreciated that multiple NICs 712 may be present in the computer 700, connecting the computer to other types of networks and remote computer systems. In some examples, the NIC 712 may be configured to perform at least some of the techniques described herein, such as packet redirects and/or other techniques described herein.

The computer 700 maybe connected to a storage device 718 that provides non-volatile storage for the computer. The storage device 718 may store an operating system 720, programs 722 (e.g., any computer-readable and/or computer-executable code described herein), and data, which have been described in greater detail herein. The storage device 718 may be connected to the computer 700 through a storage controller 714 connected to the chipset 706. The storage device 718 may consist of one or more physical storage units. The storage controller 714 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 700 may store data on the storage device 718 by transforming the physical state of the physical storage units to reflect the information being stored. The specific transformation of physical state may depend on various factors, in different examples of this description. Examples of such factors may include, but are not limited to, the technology used to implement the physical storage units, whether the storage device 718 is characterized as primary or secondary storage, and the like.

For example, the computer 700 may store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the storage device 718 by detecting the physical states or characteristics of one or more particular locations within the physical storage units.

In addition to the storage device 718 described above, the computer 700 may have access to other computer-readable storage media to store and retrieve information, such as program modules, data structures, or other data. It may be appreciated by those skilled in the art that computer-readable storage media is any available media that provides for the non-transitory storage of data and that may be accessed by the computer 700. In some examples, the operations performed by the client devices 106, the fabric AP devices 108, the fabric edge devices 110, and/or the network controller 104, and or any components included therein, may be supported by one or more devices similar to computer 700. Stated otherwise, some or all of the operations performed by the client devices 106, the fabric AP devices 108, the fabric edge devices 110, and/or the network controller 104, and or any components included therein, may be performed by one or more computer devices operating in a cloud-based arrangement.

By way of example, and not limitation, computer-readable storage media may include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 718 may store an operating system 720 utilized to control the operation of the computer 700. According to one example, the operating system 720 includes the LINUX operating system. According to another example, the operating system includes the WINDOWS® SERVER operating system from MICROSOFT Corporation of Redmond, Washington. According to further examples, the operating system may include the UNIX operating system or one of its variants. It may be appreciated that other operating systems may also be utilized. The storage device 718 may store other system or application programs and data utilized by the computer 700.

In one example, the storage device 718 or other computer-readable storage media is encoded with computer-executable instructions which, when loaded into the computer 700, transform the computer from a general-purpose computing system into a special-purpose computer capable of implementing the examples described herein. These computer-executable instructions transform the computer 700 by specifying how the CPUs 704 transition between states, as described above. According to one example, the computer 700 has access to computer-readable storage media storing computer-executable instructions which, when executed by the computer 700, perform the various processes described above with regard to FIGS. 1 through 5. The computer 700 may also include computer-readable storage media having instructions stored thereupon for performing any of the other computer-implemented operations described herein.

The storage device 718 or other computer-readable storage media described herein may also store the multicast data list created via the IGMP snooping and defining the computing devices 106, 108, 110 included in the subnetwork(s) 116 and which of those computing devices 106, 108, 110 are included within a number of multicast groups.

The computer 700 may also include one or more input/output controllers 716 for receiving and processing input from a number of input devices, such as a keyboard, a mouse, a touchpad, a touch screen, an electronic stylus, or other type of input device. Similarly, an input/output controller 716 may provide output to a display, such as a computer monitor, a flat-panel display, a digital projector, a printer, or other type of output device. It will be appreciated that the computer 700 might not include all of the components shown in FIG. 7, may include other components that are not explicitly shown in FIG. 7, or might utilize an architecture completely different than that shown in FIG. 7.

As described herein, the computer 700 may include one or more of the client devices 106, the fabric AP devices 108, the fabric edge devices 110, and/or the network controller 104, and/or other systems or devices associated with the client devices 106, the fabric AP devices 108, the fabric edge devices 110, and/or the network controller 104 and/or remote from the client devices 106, the fabric AP devices 108, the fabric edge devices 110, and/or the network controller 104. The computer 700 may include one or more hardware processor(s) such as the CPUs 704 configured to execute one or more stored instructions. The CPUs 704 may include one or more cores. Further, the computer 700 may include one or more network interfaces configured to provide communications between the computer 700 and other devices, such as the communications described herein as being performed by the client devices 106, the fabric AP devices 108, the fabric edge devices 110, and/or the network controller 104, and other devices described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 722 may include any type of programs or processes to perform the techniques described in this disclosure for the client devices 106, the fabric AP devices 108, the fabric edge devices 110, and/or the network controller 104 as described herein. The programs 722 may enable the devices described herein to perform various operations.

CONCLUSION

The examples described herein provide systems and methods for transmitting a data packet in a multicast manner to a number of devices within a mutual subnetwork within a fabric. Further, the present systems and methods allow for any data packet having TTL=1 to be bridged in a virtual network and a copy of that data packet sent over the fabric to all fabric edge devices which in turn perform L2 multicast forwarding. Further, the present systems and methods allow for any data packet having TTL!=1 (e.g., TTL>1) to be routed over the fabric to all fabric edge devices which in turn perform L3 routing to a receiving device. In this manner, the present systems and methods are able to support a myriad of different APPs that may function over L2 and/or L3.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure, and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. A method comprising:
   bridging in, via a fabric, a multicast data packet from a source device to a first edge device of a plurality of edge devices;
   determining a time to live (TTL) value of the multicast data packet;
   flooding the multicast data packet to the plurality of edge devices within a mutual subnetwork of the fabric;
   bridging out the multicast data packet from a second edge device of the plurality of edge devices to a receiving device; and
   identifying the plurality of edge devices within the fabric via snooping to create a list of the plurality of edge devices, wherein the bridging in, the flooding, and the bridging out to transmit the multicast data packet from the source device to the receiving device is based at least in part on the TTL value.

2. The method of claim 1, wherein the bridging in, the flooding, and the bridging out to transmit the multicast data packet from the source device to the receiving device is based at least in part on the multicast data packet having a TTL value of 1.

3. The method of claim 1, further comprising, based at least in part on the multicast data packet having a TTL value greater than 1, routing the multicast data packet via multicast routing.

4. The method of claim 1, further comprising
transmitting the list of the plurality of edge devices to each of the plurality of edge devices within the mutual subnetwork.

5. The method of claim 4, wherein the bridging out of the multicast data packet from the second edge device is based at least in part on the list of the plurality of edge devices.

6. The method of claim 4, wherein snooping includes Internet Group Management Protocol (IGMP) snooping including listening to network traffic within the fabric to control delivery of the multicast data packet.

7. The method of claim 1, wherein the second edge device bridges out the multicast data packet to the receiving device via layer 2 multicast forwarding.

8. A non-transitory computer-readable medium storing instructions that, when executed, causes a processor to perform operations, comprising:
bridging in, via a fabric, a multicast data packet from a source device to a first edge device of a plurality of edge devices;
determining a time to live (TTL) value of the multicast data packet;
flooding the multicast data packet to the plurality of edge devices within a mutual subnetwork of the fabric;
bridging out the multicast data packet from a second edge device of the plurality of edge devices to a receiving device; and
identifying the plurality of edge devices within the fabric via snooping to create a list of the plurality of edge devices,
wherein the bridging in, the flooding, and the bridging out to transmit the multicast data packet from the source device to the receiving device is based at least in part on the TTL value.

9. The non-transitory computer-readable medium of claim 8, wherein the bridging in, the flooding, and the bridging out to transmit the multicast data packet from the source device to the receiving device is based at least in part on the multicast data packet having a TTL value of 1.

10. The non-transitory computer-readable medium of claim 8, the operations further comprising, based at least in part on the multicast data packet having a TTL value greater than 1, routing the multicast data packet via multicast routing.

11. The non-transitory computer-readable medium of claim 8, the operations further comprising
transmitting the list of the plurality of edge devices to each of the plurality of edge devices within the mutual subnetwork.

12. The non-transitory computer-readable medium of claim 11, wherein the bridging out of the multicast data packet from the second edge device is based at least in part on the list of the plurality of edge devices.

13. The non-transitory computer-readable medium of claim 11, wherein snooping includes Internet Group Management Protocol (IGMP) snooping including listening to network traffic within the fabric to control delivery of the multicast data packet.

14. The non-transitory computer-readable medium of claim 8, wherein the second edge device bridges out the multicast data packet to the receiving device via layer 2 multicast forwarding.

15. A computing device comprising:
a processor; and
a non-transitory computer-readable media storing instructions that, when executed by the processor, causes the processor to perform operations comprising:
bridging in, via a fabric, a multicast data packet from a source device to a first edge device of a plurality of edge devices;
determining a time to live (TTL) value of the multicast data packet;
flooding the multicast data packet to the plurality of edge devices within a mutual subnetwork of the fabric;
bridging out the multicast data packet from a second edge device of the plurality of edge devices to a receiving device; and
identifying the plurality of edge devices within the fabric via snooping to create a list of the plurality of edge devices,
wherein the bridging in, the flooding, and the bridging out to transmit the multicast data packet from the source device to the receiving device is based at least in part on the TTL value.

16. The computing device of claim 15, the operations further comprising, based at least in part on the multicast data packet having a TTL value greater than 1, routing the multicast data packet via multicast routing.

17. The computing device of claim 15, the operations further comprising
transmitting the list of the plurality of edge devices to each of the plurality of edge devices within the mutual subnetwork.

18. The computing device of claim 17, wherein the bridging out of the multicast data packet from the second edge device is based at least in part on the list of the plurality of edge devices.

19. The computing device of claim 17, wherein snooping includes Internet Group Management Protocol (IGMP) snooping including listening to network traffic within the fabric to control delivery of the multicast data packet.

20. The computing device of claim 15, wherein the second edge device bridges out the multicast data packet to the receiving device via layer 2 multicast forwarding.

* * * * *